RESILIENT SHOCK ABSORBING BUMPER

Filed Feb. 11, 1964 2 Sheets-Sheet 1

RESILIENT SHOCK ABSORBING BUMPER

Filed Feb. 11, 1964 2 Sheets-Sheet 2

3,291,516
RESILIENT SHOCK ABSORBING BUMPER

Stephane Kavos, 28 Rue Nungesser et Coli,
Paris, France

Filed Feb. 11, 1964, Ser. No. 344,094
Claims priority, application France, Feb. 13, 1963,
924,595; June 18, 1963, 938,425
1 Claim. (Cl. 293—67)

The present invention relates to a device for damping shocks and/or vibrations which is especially although not exclusively designed for use on the bumpers of motor vehicles.

It is known to protect metallic bumpers of motor vehicles by means of shaped strips of rubber which are either fitted or inset in a base formed of a metallic strip which is also shaped. However, whilst such a solution does offer an advantage in that the shaped rubber component can readily be fitted on its base, it does none the less give rise as a direct consequence to a disadvantage, namely, that the shaped rubber component is liable to become dislodged as a result of an impact and then easily torn away over its entire length.

In order to overcome this disadvantage, it has already been proposed to reinforce a mass of rubber with a metallic cable which is inserted at intervals through an eyelet provided on the end of each screw or threaded rod which serves to attach the combined assembly to the bumper.

Such a solution is subject to a number of drawbacks: in point of fact, those zones of the mass of rubber which are located at the level of the eyelets have a thickness which is much smaller than in the remainder of the section of the strip of reinforced rubber, with the result that the said zones constitute particularly weak points and that it is therefore necessary to employ a thickness and consequently a volume of rubber which are much greater than when the metallic projection formed by each eyelet of the fastening rods is not provided on the reinforcing means. This disadvantage results in the need to increase the dimensions (and volume) of the mold and consequently increases the cost price of the said mold, thereby entailing a capital outlay and final cost which are both relatively high. Moreover, this process calls for the use of a number of different molds corresponding to the number of different bumpers to be equipped, with the result that the cost price of the article is considerably higher than in the case in which it were possible to form the said article by extrusion of a shaped rubber element.

Should an impact take place exactly in the place at which the eye of a fastening rod is located, the elastic protective covering is liable to shear, thereby resulting in damage to the article.

The object of the invention is to provide a device for damping shocks and vibrations which is of very simple design, is of universal application, and has a very low cost price.

Another object of the invention is to permit the possibility of providing protection for a series of bumpers of different types by means of a single model of shock-absorbing device.

Another object of the invention is to permit a supply of protection material in the form of rolls.

Yet another object of the invention is to provide a protecting device which can be attached to the existing metal bumper of a car without entailing the need to remove the bumper.

In order to achieve the objects referred to above, the device in accordance with the invention, which is of the type comprising a shaped element formed of elastomer and strengthened by a rigid core, is characterized in that the said shaped element is provided with a longitudinal groove having a T-shaped cross-section wherein at least one strengthening strip is fitted within the transverse branch of the T and is intended to be made integral with the support on which the said device is to be mounted by fastening means which are inserted through the other branch of the aforesaid T-section groove.

As a result of the free association of a strengthening strip and the elastic covering of said strip, there is thus provided a complex material which is endowed with both flexibility and rigidity.

By virtue of the particular design of the device in accordance with the invention, it is possible to fabricate the rubber section or shaped element by extrusion in an extruding machine and therefore at an exceptionally low cost price, and in continuous production either in substantial lengths or in rolls, thereby facilitating storage and handling.

The device in accordance with the invention can be employed not only on vehicle bumpers but also in a large number of fields. For example, the device can be employed to provide interior and exterior fittings of vehicles, both for protection against shocks and for sound insulation; as interior fittings of glass-makers' and glaziers' delivery trucks (lorries); as beadings for the protection of drivers on dashboards; as lining strips around the upper peripheral edges and gunwales of motorboats; as barrel hoops; or again as anti-vibration and sound-insulating supports for devices of various types such as vacuum cleaners, electric motors and so forth.

In one embodiment, the means for securing the reinforced section on the support consist of conventional means such as a screw, the flat head of which is also set within the transverse branch of the groove of the shaped element and the stem of which passes through the support. The screws can be of the self-tapping type if the support is metallic (as in the case of automobile bumpers).

In another embodiment, since the strengthening core is of metal, said core can be spot-welded directly against a support which is also of metal.

A better understanding of the invention will be had by consideration of the following description and by study of the accompanying drawings in which a few embodiments of the invention are shown solely by way of examples.

Figure 2:
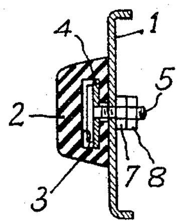
FIG. 2 is a transverse sectional view taken along the line II—II of FIG. 1.
Figure 1:
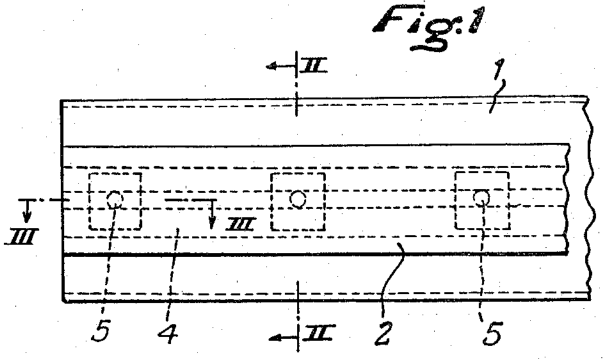
FIG. 1 is a front view of a first embodiment of a portion of a shock-absorbing device in accordance with the invention, said device being mounted on the flat bumper of a light delivery vehicle, for example.

The bumper of a light delivery vehicle, which has been chosen as a support in FIGS. 1 and 2, is of a very simple type consisting of a channel section 1 of sheet steel and having very shallow flanges. The protection device in accordance with the invention consists of a section or shaped element 2 of either natural or synthetic rubber or like elastomer and having a trapezoidal cross-section in the example, the large base of which is applied against the front face of the bumper.

Figure 4:
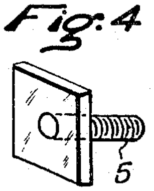
FIG. 4 is a perspective view of a screw for the purpose of securing the shaped element to the bumper.

The rubber section 2 is provided with a longitudinal groove 3 having a T-shaped cross-section, there being fitted within the transverse branch of the T a strengthening core consisting of a rigid strip 4 of steel, aluminum or other suitable rigid material. The attachment of the protection device to the bumper is effected by means of screws 5 (as shown in FIG. 4) having wide and very flat heads which are also fitted within the transverse branch of the groove 3, the shank of each screw being inserted first through a corresponding hole formed within the strengthening core 4, then through the other branch or stem" of the T and finally through a corresponding hole formed in the bumper 1. A nut 7, and if necessary a lock-nut 8 which are screwed onto the extremity of screw, maintain the combined assembly in position.

The fitting of a bumper protector of this type requires no preparation whatever. In point of fact, it is merely necessary to cut the rubber section and its strengthening core to the desired length, to pierce both the core and the bumper by drilling at suitable points, for example, at intervals of 15 centimeters, for the insertion of the fixing-screws, whereupon it only remains to set the combined assembly in position and screw it onto the bumper.

The shaped element or section which is formed of elastomer and which has a constant cross-section can be fabricated very economically by extrusion in an extruding machine. After the strengthening core has been fitted therein, the said shaped element can be stored in rolls. The new complex material which is thus obtained lends itself very readily to cutting according to requirements.

Figure 3:
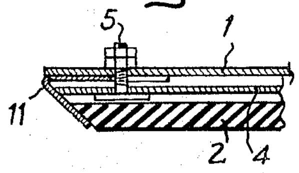
FIG. 3 is a partial longitudinal section taken along the line III—III of FIG. 1.
Figure 5:
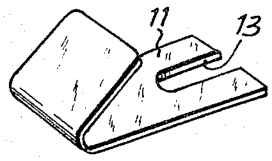
FIG. 5 is a perspective view of a fitting plate for the extremity of the reinforced section or shaped element.

In order to embellish the end of the protection device and especially in order to mask the end of the groove 3, the long arm of a fastening bracket 11 which is shown in perspective in FIG. 5 is clamped between the extremity of the base of the shaped element 2 and the bumper 1, the outer portion of said bracket being folded back at an acute angle against the end face, preferably chamfered, of the shaped element 2 (as can especially be seen from FIG. 3). For convenience of assembly, the bracket 11 is provided with a slot 13 so that the said bracket can accordingly be engaged beneath the screws for attaching the protector to the bumper before said screws are tightened hard up.

Figure 6:
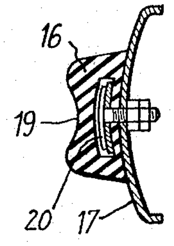
FIGS. 6 and 7 show two alternative forms of the shaped element of FIGS. 1 and 2 which are mounted on a convex bumper and on a concave bumper respectively.
Figure 7:
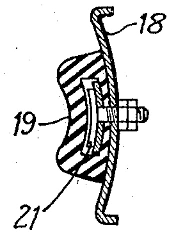
Figure 8:
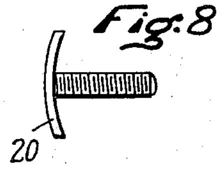
FIGS. 8 and 9 illustrate respectively the screws for securing the shaped elements of FIGS. 6 and 7.
Figure 9:
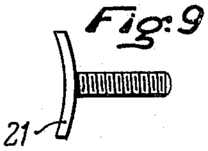

FIG. 6 shows the manner in which the flexible section or shaped element 16 can closely conform to the convex shape of a support 17, and FIG. 7 shows the manner in which said shaped element can similarly conform to the shape of a concave support 18. The corresponding fixing-screws have respectively a convex head 20 and a concave head 21 as shown respectively in FIGS. 8 and 9. The strengthening-core strips (not shown) are curved in the same manner and endow the flexible section or shaped element with a corresponding curvature. As an alternative form, the front face of the shaped element has been shown with a central longitudinal depression 19.

Figure 10:
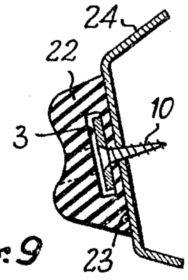
FIGS. 10 and 11 show another alternative form of symmetrical reinforced section or shaped element to be mounted on a bumper which is inclined at an angle either in one direction or in the other; it has been assumed in these figures that the attachment of the shaped element has been effected by means of self-tapping screws.

FIG. 10 shows a shaped element 22 which a cross-section of asymmetrical configuration, and the base 23 of which is inclinded with respect to the front of said shaped element in such a manner as to be adapted on bumpers such as the bumper 24, the front face of which is in turn inclined downwards and to the rear.

Figure 11:
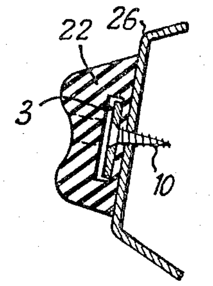

FIG. 11 shows the manner in which the same shaped element 22 can be employed on a bumper 26 which is inclined upwards and to the rear by mounting said element upside down, the front face thereof thus remaining substantially vertical.

It has been assumed in the above-mentioned FIGURES 10 and 11 that the attachment of the protecting device is effected by means of self-tapping screws 10.

Figure 12:
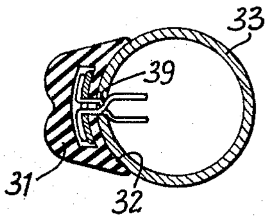
FIG. 12 shows an alternative form of reinforced section or shaped element as mounted on a tubular support.
Figure 13:
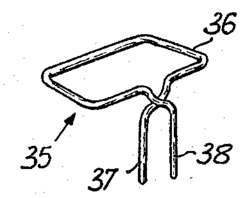
FIG. 13 is a perspective view of the fastening clip which is employed for the attachment of the shaped element in the embodiment of FIG. 12.

There has been shown in FIG. 12 an embodiment in which the base of the shaped element 31 has the shape of a portion of cylindrical surface 32 in such a manner as to be applied exactly against the cylindrical outer surface of a tubular bumper 33. In this example, the attachment of the shaped element on the bumper is effected by means of flexible fastening clips 35 (as shown in FIG. 13) of a type which is in common use in the automobile industry. The said fastening clips are fabricated of steel wire and comprise a portion 36 of rectangular configuration and two parallel arms 37, 38 which intersect with each other and which are oriented in a direction at right angles to the plane of the rectangle 36. The rectangular portion of the fastening clip is fitted within the transverse branch of the T-shaped groove of the shaped element 31 whilst the arms 37 and 38 of said clip are inserted in holes such as the hole 39 which are formed at intervals in the tube 33. Attachment of the assembly is effected as a result of the tendency of the two arms of said clips to separate by reason of their natural resiliency after crossing each other at a precise point within the interior of the hole 39.

Figure 14:
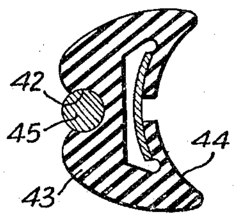
FIG. 14 shows an alternative form in which the flexible shaped element is additionally fitted with a chrome strip.

FIG. 14 shows an embodiment which comprises a groove 42 formed in the front face of the shaped element 43, namely in the face which is located opposite the bearing face 44 of said element, the profile of said groove being so designed as to form lips which grip and retain a chrome strip 45.

Figure 15:
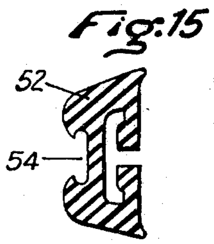
FIGS. 15 and 16 show two other alternative forms of the section.
Figure 16:
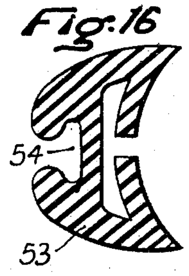

FIGS. 15 and 16 show two alternative forms of rubber sections or shaped elements 52, 53 in which provision has been made for an additional groove 54 in the front face of a shaped element, the bearing face of the element shown in FIG. 15 being flat and the bearing face of the element shown in FIG. 16 being concave.

Figure 17:
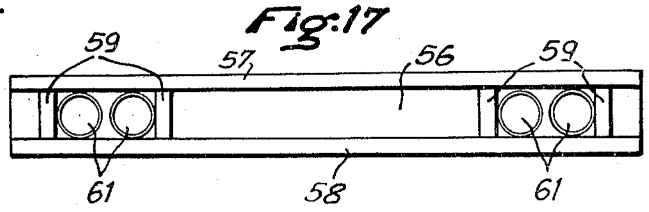
FIG. 17 represents a front view of an application wherein the shaped elements in accordance with the invention are fitted on the bumper of a heavy truck (lorry).
Figure 18:
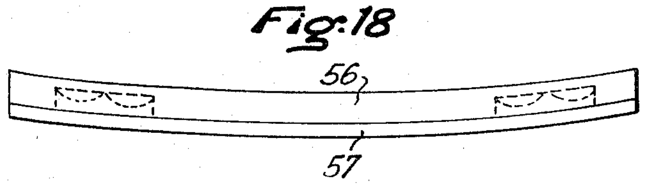
FIG. 18 is a corresponding plan view.

FIGS. 17 and 18 show the manner in which it is possible in the case of a commercial truck, for example, to fit a bumper 56 with two protection elements 57, 58 along the top and bottom edges respectively of the bumper as well as segments of a similar element such as the segments 59 which are disposed vertically so as to form frames for the protection of headlights 61.

Figure 20:
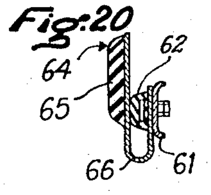
FIG. 20 is a profile view corresponding to FIG. 19.
Figure 19:
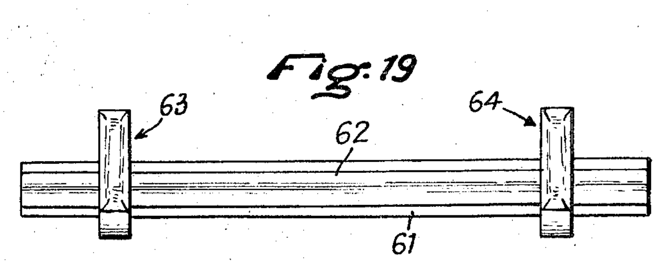
FIG. 19 is a front view of a bumper which is fitted with a shock-absorbing device and two overriders.
Figure 21:
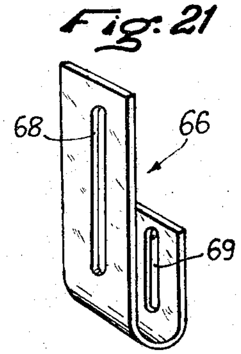
FIG. 21 is a view in perspective of the fastening bracket of an overrider of the device of FIGS. 19 and 20.

In FIGS. 19 and 20, there has been shown a bumper 61 on which is fixed a shaped element 62 and which has additionally been fitted with two overriders which are respectively designated by the reference 63 and 64. Each overrider such as, for example the overrider 64 is constituted by a portion 65 of shaped element in accordance with the invention which contains a strengthening strip of corresponding length which is secured to one of the arms of a fastening bracket 66 shown on a larger scale in FIGURE 21, whilst the other arm of said bracket is clamped between the shaped element 62 and the bumper 61. The bracket 66 is cambered in the shape of a J and the two arms thereof are provided with elongated slots 68, 69 through which can be inserted the means for securing the shaped elements to the corresponding arms, thereby permitting the possibility of placing the overrider in the desired direction and at any suitable height.

Figure 22:
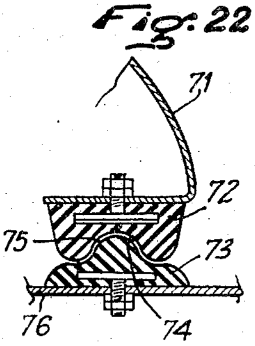
FIG. 22 shows an application wherein two shaped elements in accordance with the invention are employed as bearing strips for the hood (bonnet) of a motor vehicle.

FIG. 22 shows another application of a shock-absorbing device in accordance with the invention, namely as a bearing strip which supports a hood (bonnet) 71 of a motor vehicle body. A shaped element 72 is secured against the under-face of the bottom flange of the hood (bonnet) 71 whilst another shaped element 73 is secured to the edge of the bearing surface 76 on which said hood rests. One of the two shaped elements, preferably the element 72, is provided with an additional longitudinal groove 74 and the other shaped element 73 is provided with a complementary projecting bead 75. There is thus provided an assembly without play between the hood 71 and the vehicle body 76 and vibrations are thus effectively damped.

Figure 23:
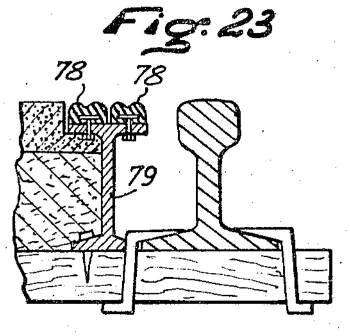
FIG. 23 shows the application of the invention to the protection of the level-crossing guard-rail of a railroad track.

FIG. 23 shows the use of two reinforced sections or shaped elements 78 which are fixed on the level-crossing guard rail 79 of a railroad track.

Figure 24:
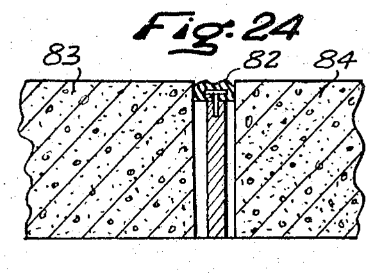
FIG. 24 shows the application of the shaped element in accordance with the invention to the formation of an expansion joint between two concrete slabs of the type employed in airfield runways or main highways and expressways.

FIG. 24 shows the utilization of a reinforced section or shaped element 82 for the purpose of forming a sealing joint between two concrete slabs 83, 84 of an automobile expressway or airfield runway.

Figure 25:
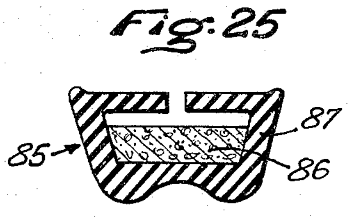
FIG. 25 illustrates an alternative form of the shaped element in accordance with the invention, said shaped element being fabricated of composite material.

Finally, FIG. 25 shows a form of embodiment of a flexible shaped element 85 comprising two portions of different composition, namely, an internal portion 86 of cellular material which is enclosed within an external portion 87 of non-cellular material, these two materials being both resilient and flexible.

A shaped element of this type is suitable for use especially when it is desired to have greater resiliency, for example with a view to providing protection for the driver of a motor vehicle; in this case, said shaped element is placed along the dashboard or alternatively on the internal face of the top or roof of the car, which has the additional advantage of providing sound insulation of the vehicle.

It will readily be apparent that the invention is not limited to the embodiments which have been described and illustrated and that a large number of modifications can be made therein without consequently departing either from the scope or the spirit of the invention.

What I claim is:

In combination with a bumper for attachement to a vehicle, a J-shaped vertical guard mounted on the bumper, an elastomeric element mounted on a face of the J-shaped vertical guard facing away from the bumper, positioned in the bight of the J-shaped vertical guard and extending transversely along the bumper a second elastomeric element, said second elastomeric element being provided with a longitudinal groove having a T-shaped cross-section the middle branch of which opens to a face of said second elastomeric element facing the bumper, at least one flat strengthening strip fitted within said groove and having essentially the same cross-section as the transverse branch of said T-shaped cross-section, and fastening means extending through said middle branch of said T-shaped cross-section and connecting said strip to said bumper.

References Cited by the Examiner

UNITED STATES PATENTS

| | | | |
|---|---|---|---|
| 1,972,283 | 9/1934 | Zimmers | 280—163 |
| 2,146,090 | 2/1939 | O'Rourke | 293—54 |
| 2,153,896 | 4/1939 | Mohar | 293—69 |
| 2,161,837 | 6/1939 | Tell | 293—62 |
| 2,284,422 | 5/1942 | Hall | 52—716 |
| 2,531,967 | 11/1950 | Bishop | 293—71 |
| 2,624,596 | 1/1953 | Clingman | 293—71 |
| 2,959,146 | 11/1960 | Erkert | 114—219 |
| 2,986,419 | 5/1961 | Barenyi | 293—62 |
| 3,019,758 | 2/1962 | Erkert | 114—219 |
| 3,147,176 | 9/1964 | Haslam | 161—39 |

FOREIGN PATENTS

| | | |
|---|---|---|
| 1,039,729 | 5/1953 | France. |

ARTHUR L. LA POINT, *Primary Examiner.*

H. BELTRAN, *Assistant Examiner.*